Oct. 19, 1954　　　H. M. FARNHAM, JR　　　2,691,885
APPARATUS FOR DETECTING THERMOPLASTIC PROPERTIES
Filed April 7, 1952

Harry M. Farnham, Jr. Inventor
By W. O. Teilman Attorney

Patented Oct. 19, 1954

2,691,885

UNITED STATES PATENT OFFICE 2,691,885

APPARATUS FOR DETECTING THERMOPLASTIC PROPERTIES

Harry M. Farnham, Jr., Roselle, N. J., assignor to Standard Oil Development Company, a corporation of Delaware Application April 7, 1952, Serial No. 280,937

1 Claim. (Cl. 73—15)

This invention concerns a novel apparatus for the testing of thermoplastic materials, in order to determine heat sensitive properties of the materials. The apparatus disclosed herein is particularly applicable to the testing of waxes in order to determine the "blocking point" of the wax. In accordance with the invention an apparatus is provided imposing a temperature gradient along the length of a thermoplastic material to be tested. After a suitable heating period, examination of the length of sample will establish points along the sample affected by the local temperature there existing. The points along the length of the sample so affected may then be translated to the temperatures there existent for a precise identification of the temperatures at which the heat sensitive results occur.

In the case of a great many thermoplastic materials it is desirable to determine the particular temperature at which certain changes in the material may occur. For example, in the case of an asphalt it is frequently desirable to ascertain the lowest temperature at which "bleeding" of the asphalt occurs, which would cause staining of materials in contact with the asphalt. In the case of waxes, the property known as "blocking" is similarly important. It is the purpose of this invention to provide an apparatus for conveniently and precisely determining these and other properties of thermoplastic materials. This invention is particularly applicable for the determination of a wide range of heat sensitive properties of thermoplastic materials which cause a visible change in the appearance of the materials. However, in the disclosure which follows, reference will particularly be made to the testing of wax for determination of blocking point and other properties of the wax.

A large portion of the total output of refined paraffin waxes is now employed by users who apply paraffin waxes or blends of paraffin waxes to paper products. The wax-coated paper is employed to wrap bread, cereal, crackers, etc. In this usage a critical property of the wax is identified as the blocking point of the wax. The blocking point may be defined as the lowest temperature at which a given wax surface may become marred or may stick to an adjacent wax surface of the same material. This property is important during wrapping operations and during marketing. Sticking and marring of the waxed papers at temperatures existent during storage or wrapping will result in an unsaleable product or troublesome operation of the wrapping machinery.

While the adverse effects of wax blocking are distinct, at the same time no readily convenient test to determine this property is now known. In the case of many waxes there is some correlation between the melting point or hardness of the wax and the blocking point. However, assignment of blocking point values to a particular wax, based on melting point or hardness is not precise and may lead to erroneous evaluation of the wax. The need therefore exists for a direct and accurate blocking point determination test.

Attempts have been made to provide such direct blocking point tests. One method which is known and has been employed concerns the placement of strips of coated wax paper in an oven at a specified temperature for a period of 16 hours. Two strips of the wax paper are placed in contact and are maintained in the oven under a weight for this period of time. At the end of the test period the strips are pulled apart and a visual estimation is made as to whether or not the surface of the wax is marred. The strips are tested in this manner at temperature increments of 5° F. until a temperature is determined at which marring is detectable which is reported as the blocking temperature.

A test of this nature is a good example of the difficulties and unsuitability of present blocking point determinations. In a procedure of this type, it is necessary to test the same wax a number of times at different temperatures in order to permit an estimation of the blocking point. This makes the test cumbersome since sample preparation and evaluation time are appreciable. Again, as suggested, a test of the indicated character can only provide an indication of the blocking point within about plus or minus 5° F. Finally, the test is of such a nature that light spotting may erroneously be evaluated as marring, characteristic of blocking point, in the visual examination method employed. Consequently, it may be stated as the specific object of this invention to provide an improved blocking determination test overcoming these and other indicated disadvantages of present tests.

In accordance with this invention, the thermoplastic material to be tested is coated on a strip of paper, or alternatively a thin sheet of the thermoplastic material is used. The sheet of material or the strip of coated paper is then doubled to permit contact of the two faces of the thermoplactic material and is maintained under a constant weight along its length. The weighted thermoplastic material is then placed on a metallic bed along the length of which a temperature gradient is maintained. After a period of time the weight is removed and the thermoplastic material is pulled apart and visually examined to determine the point or points along its length at which heat sensitive effects occur. This point along the length of the material will correspond to a given local temperature established by the position of this point along the temperature gradient bed. The temperature gradient may be adjusted so that at some point along the bed the heat sensitive effect of interest will occur. Thus, in the case of wax, a strip of this nature may disclose the temperature at which all degrees of mar, spotting, and sealing occur. Since the complete temperature sensitive spectrum of the thermoplastic material may thereby be represented on a single strip, it becomes possible to precisely identify that condition corresponding to the blocking point or other selected temperature responsive characteristic. In the case of blocking, a sharp demarkation normally exists between the blocked and non-blocked areas of the sample strip.

This method is particularly desirable since viewing skill is minimized and little experience is required to identify the critical properties of the material displayed along the strip of test sample. In this connection the light in which examination is made or the angle of viewing the strips are not nearly as critical as in other inspection methods employed. Finally, it is to be noted that the method of determining temperature properties provides a continuous temperature scale permitting close determination of the particular temperature at which a particular effect occurs. As will be brought out, the apparatus of this invention is furthermore advantageous in requiring a relatively short heating period.

The accompanying drawing illustrates a preferred form of apparatus for carrying out the method of this invention in determining the blocking points of waxes. In this drawing.

Figure 1:
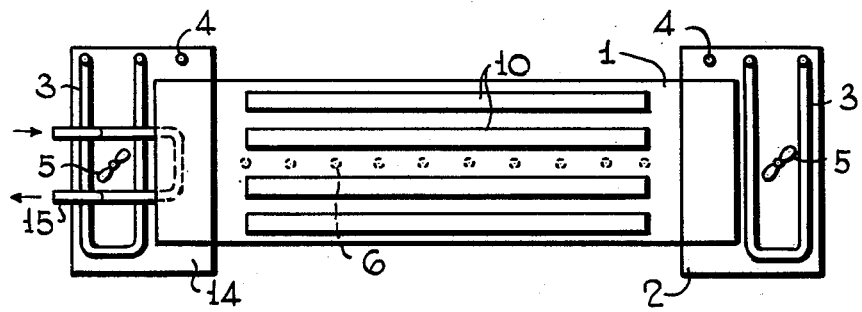
Figure 1 is a plan view of the apparatus showing the arrangement of a plurality of waxed paper samples on the bed employed.
Figure 2:
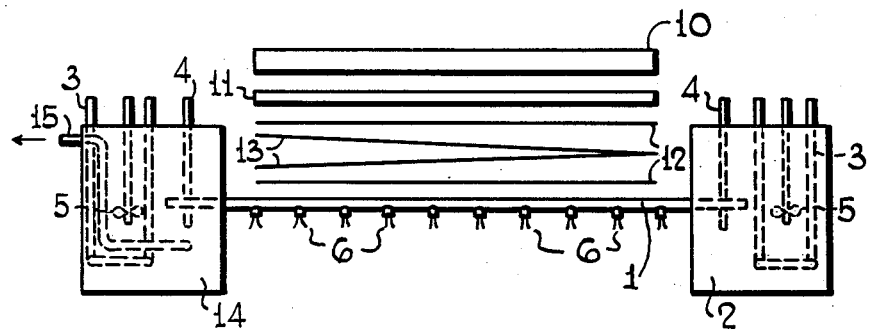
Figure 2 is an elevation view of Figure 1 showing the placement of thermocouples and the heating and cooling elements associated with the bed of the apparatus. Included in Figure 2 at the upper portion thereof is a diagrammatic representation of the manner of placing the wax strips to be tested on the bed beneath a weighting bar.

Referring to the drawings, the numeral 1 designates a metal plate, which is preferably constructed of an efficient heat conductor such as aluminum, for example. It is essential that the plate constitute a good heat conductor in order to insure that the temperature of the plate will be constant laterally across the plate at any point along its length. Again a substantially linear temperature gradient may be established along the length of a good heat conductor. At one end of the plate 1, suitable heating means are provided to heat this end of the plate to a higher temperature than that maintained at the other end of the plate. In the drawing, a constant temperature oil bath 2 is illustrated at the right-hand end of the plate 1 for this purpose. To provide the necessary heat exchange relation with the plate, it is particularly preferred that one end of the plate extend directly into the constant temperature bath as shown. Any desired liquid heat exchange medium may be employed in the constant temperature baths. A light mineral oil may be employed in the bath together with an electrical heater 3, mercury temperature controller 4, and agitator 5. In the case of wax blocking point determinations, the bath should maintain a temperature in the range of about 140°–160° F., plus or minus 0.5° F.

At the opposite end of plate 1 a similar constant temperature bath 14 is preferably employed to maintain a lower temperature. For wax blocking point determinations, the bath 14 should maintain a temperature in the range of about 75°–85° F. For this purpose, in addition to agitator 5, heater 3 and temperature controller 4, a cooling coil 15 is preferably employed. Passage of cooling water through coil 15 aids in positively maintaining a temperature of the magnitude indicated. As described, the baths in which both ends of plate 1 are immersed, maintain a temperature differential of about 55°–65° F., along the length of the plate. It is apparent that other heating and/or cooling means such as strip heaters, condensers and the like could be employed. However, the arrangement described has practical advantages and is preferred.

It is apparent that as described, the bed plate 1 will be heated at one end and maintained at a cooler temperature at the other end to establish a temperature differential from one end of the bed plate to the other. The temperature existent at different points along the bed plate may be determined by means of thermocouples 6, for example, which may be suitably placed in the bed plate. As great a number of thermocouples as desired may be employed to permit determination of relatively small temperature gradients along the plate. As stated heretofore the construction is such that the temperature laterally across the plate is substantially the same, so that a single row of thermocouples 6 along the length of the plate may practically be employed.

In employing this apparatus for testing purposes, a paper or suitable absorbent material may be coated with the thermoplastic material to be examined, for example, wax. Two strips of waxed paper or one double strip designated by the numeral 13 are placed together so as to bring the coatings of wax in contact. Preferably, these two strips of thermoplastic coated paper are then sandwiched between two uncoated paper strips designated by the numeral 12 and are then placed on the bed plate 1. Immediately above these strips of paper a rubber pad 11 or other resilient material is positioned. The function of this pad is to distribute the weight of a metal bar 10 placed above the pad so as to evenly press the waxed paper against the bed plate.

When the strips of thermoplastic material are thus supported on the apparatus, a heating period is initiated which may vary in length depending upon the particular material tested. Again the particular heat gradient maintained along the plate during the heating period will depend upon the material to be tested. In the case of wax, a temperature gradient of about 3° F./inch, and a heating period of several hours may be employed. One end of the bed may be at about room temperature or somewhat above, while the other end of the bed may be at about 150° F., or somewhat higher, depending upon the melting point of the particular wax to be tested. After the heating period, the waxed paper is removed from the apparatus and pulled apart. Thereafter visual inspection will show at what point along the length of the bed wax spotting, wax blocking and wax sealing occur. The temperature causing these effects will then be provided by reference to the temperature calibration curve established by the thermocouples along the bed.

Typical data showing the utility of this invention is presented in the following table for a variety of wax samples. During the conduct of the tests the apparatus was maintained to provide a temperature at the hot end of 150° F., and a temperature at the cold end of about 85° F. extending over an 18-inch section. The data in Table I presents the results for a variety of waxes constituting refined paraffin waxes. In the first principal column of the table, entitled "Oven Method," results are shown based on the oven method described for determining the blocking point of each of the waxes listed. In the remaining columns of the table, results are presented as obtained by the apparatus of this invention. Furthermore, data are presented showing heating periods of both 7 and 16 hours when employing this invention. Again, data are shown giving the results when employing both hand-coated and machine-coated wax samples:

TABLE I

*Blocking point of paraffin waxes by the gradient method*

| | Blocking Point, ° F. | | | | |
|---|---|---|---|---|---|
| | "Oven Method" | Gradient Method | | | |
| Type of Waxed Strips | Machine-Coated | Machine-Coated | | Hand-Coated | |
| Test Duration, Hours | (¹) | 16 | 7 | 16 | 7 |
| ASTM Melting Pt. °F.: | | | | | |
| 131.8 | 95 or less | 94 | 95.5 | 95 | |
| 131.7 | 95 | 94 | 95 | | |
| 133 | 95 | | | 98 | 97 |
| 132.9 | 100 | | | 103 | 100 |
| 132.6 | 105 | 100 | 102 | | |
| 133 | 105 | | | 106 | 107 |
| 137.2 | 110 | 107 | 107 | 110 | |
| 136.6 | 110 | | | 111 | 109 |
| 136.3 | 110 | 107 | 107 | | |
| 137 | 110 | 105 | 105 | | 109 |
| 141.9 | 115-120 | 115 | 117 | 116 | |
| 146.1 | 120 | 122 | 124 | 122 | |
| 151.8 | 135 | | | 134 | 133 |

¹ Several 16-hour tests are required; at least two and usually more uch periods are necessary.

As shown in the table, the apparatus of this invention provided blocking point determinations which essentially corresponded to those obtained by the more cumbersome and less advantageous oven method. Again it is shown that the results may be obtained in seven hours or less, rather than requiring the 16-hour test period generally employed in the oven method. Finally, this data show that accurate data can be obtained by employing hand-coated waxed paper strips rather than machine-coated strips. This point is important since it is much easier to prepare a hand-coated testing sample.

It is apparent as described that the apparatus of this invention is broadly applicable for determining the temperature sensitive properties of virtually any plastic material. In every case a sheet of the material can be employed or the material may be coated on a mounting paper or pad so as to be maintained on the heated bed described. The apparatus is of particular interest for application in the oil refining field to determine the bleeding characteristics of asphalts and greases and to determine the heat sensitive properties of waxes.

What is claimed is:

An apparatus for determining the effect of temperature on thermoplastic materials when disposed in opposed surface contact, comprising an elongated bed plate member of a heat conductive metal having upper and lower substantially flat surface portions adapted to receive a pair of strip portions including said thermoplastic materials disposed longitudinally on the upper surface of said plate member in opposed surface contact one to another; separate means for heating one end of said plate member and for cooling the other end thereof, including temperature control means therefor, adapted to produce a predetermined temperature gradient through said plate from end to end; a series of thermocouple elements engaging the lower surface of said plate member in closely spaced relation longitudinally of said plate; and means for engaging said strip portions in substantially uniform surface contact with each other upon the upper surface of said plate member, including a resilient overlay for said strip portions and a superimposed bar weight member coextensive therewith, adapted to compress said strips between said overlay and the upper surface of said plate.

References Cited in the file of this patent

UNITED STATES PATENTS

| Number | Name | Date |
|---|---|---|
| 2,336,238 | Fordyce et al. | Dec. 7, 1943 |
| 2,464,546 | Albright | Mar. 15, 1949 |
| 2,588,355 | Burr et al. | Mar. 11, 1952 |

FOREIGN PATENTS

| Number | Country | Date |
|---|---|---|
| 815,706 | Germany | Oct. 4, 1951 |